March 28, 1939.  H. H. BUHR  2,152,134
CULTIVATOR DISK GANG OPERATOR
Filed June 30, 1938  3 Sheets-Sheet 1

Inventor
H. H. Buhr
By Clarence A. O'Brien
and Hyman Berman
Attorneys

March 28, 1939.  H. H. BUHR  2,152,134
CULTIVATOR DISK GANG OPERATOR
Filed June 30, 1938  3 Sheets-Sheet 2

Inventor
H. H. Buhr
By Clarence A. O'Brien
and Hyman Berman
Attorneys

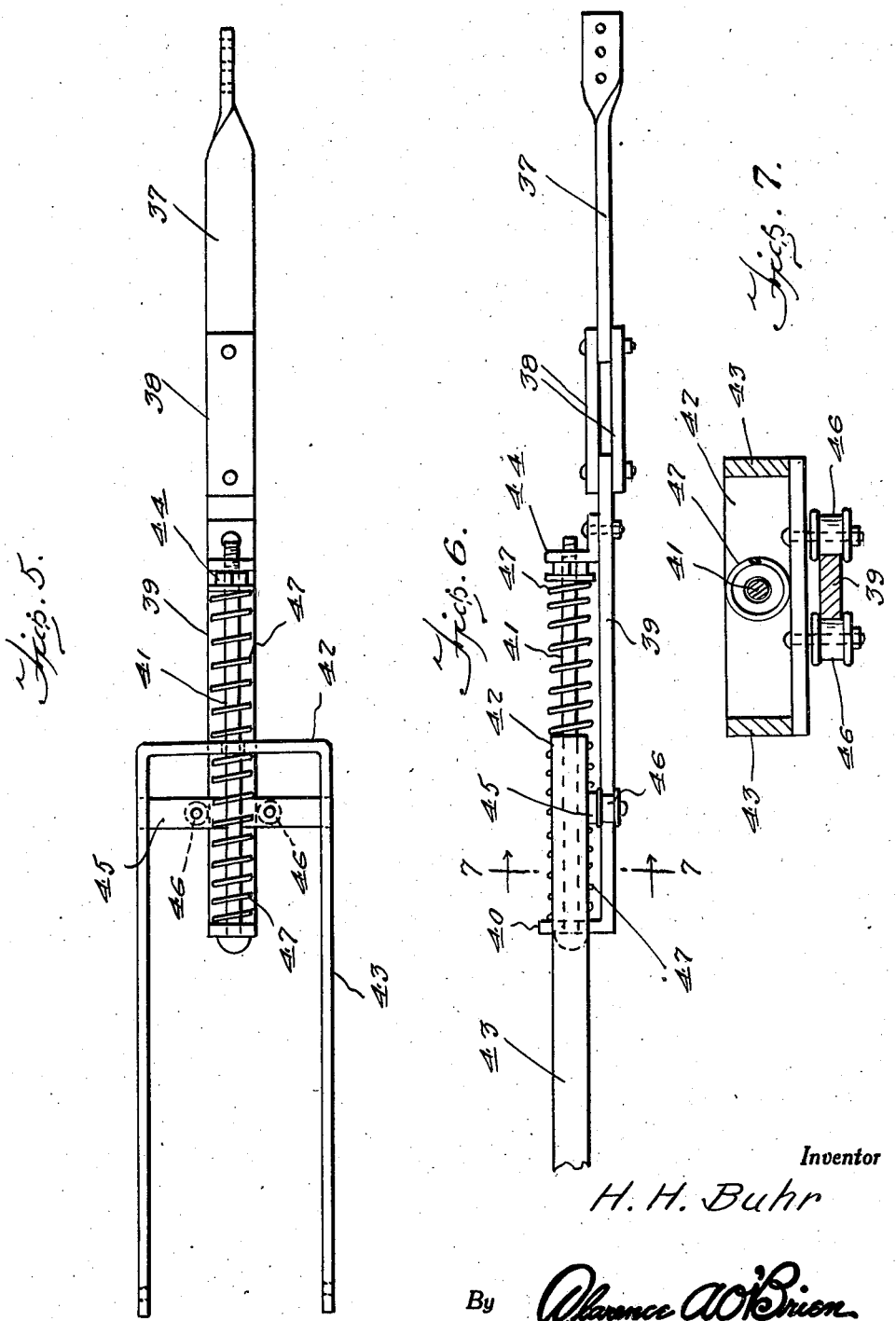

Patented Mar. 28, 1939

2,152,134

UNITED STATES PATENT OFFICE 2,152,134

CULTIVATOR DISK GANG OPERATOR

Harry H. Buhr, Sumner, Iowa, assignor of one-half to Fred Buhr, Sumner, Iowa

REISSUED
OCT 22 1940

Application June 30, 1938, Serial No. 216,791

3 Claims. (Cl. 55—81)

This invention appertains to new and useful improvements in agricultural implements and particularly to a control for disk harrows.

The principal object of the present invention is to provide a control whereby a disk harrow can have its disks raised or lowered with respect to the ground automatically when connected with a tractor.

Another important object of the invention is to provide a disk harrow constructed in such a manner that it can be employed in conjunction with the usual power take off of a tractor to the end that the operator can control the disks without getting off of the tractor.

These and various other important objects and advantages of the invention will become apparent to the reader of the following specification.

In the drawings:

Figure 4 is a perspective view of the tension bar.

Figure 5 is a top plan view of the connecting assembly.

Figure 6 is a side elevational view of the connecting assembly.

Figure 7 is a cross sectional view on the line 7—7 of Figure 6.

Figure 1:
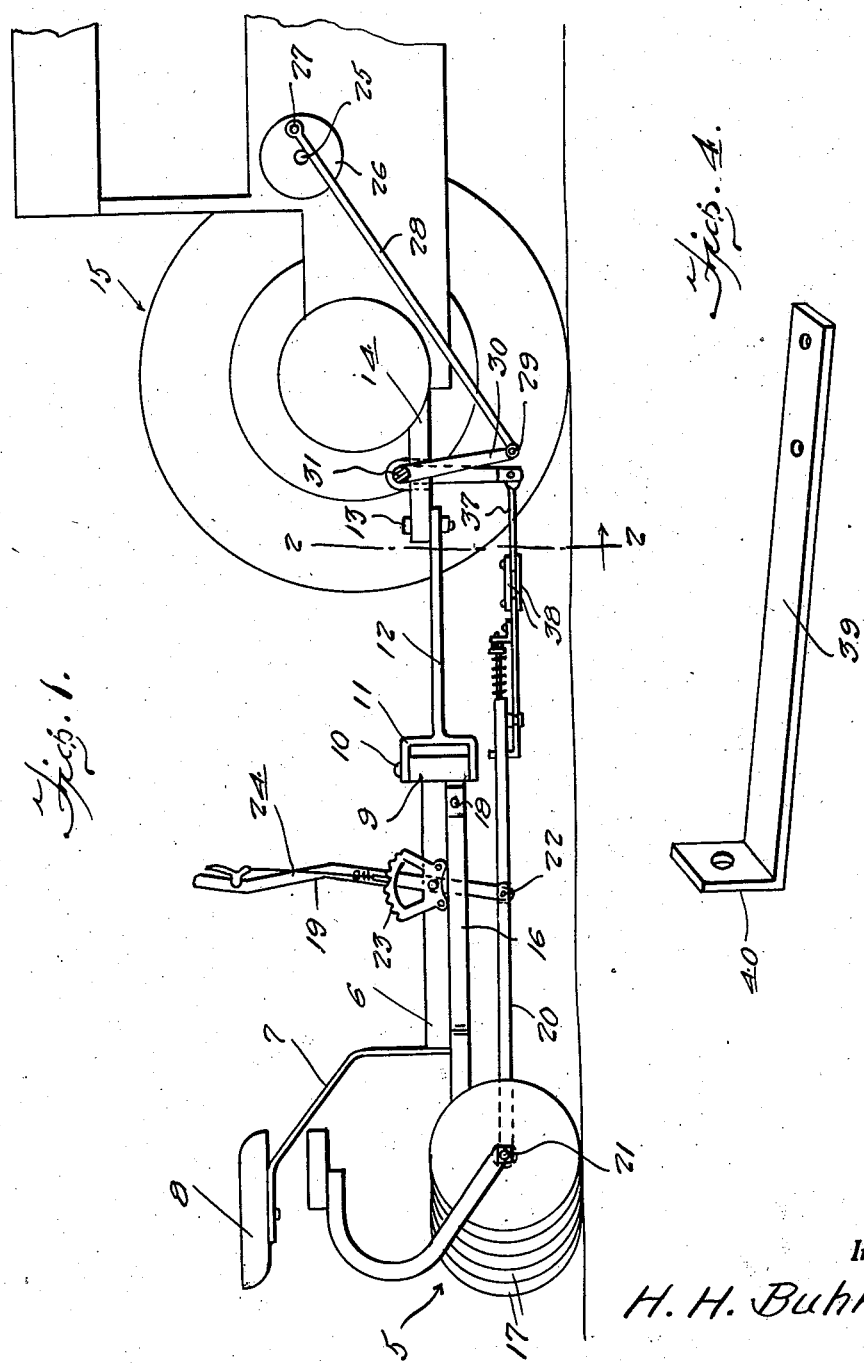
Figure 1 represents a side elevational view of the harrow showing the control means partly in section.
Figure 2:
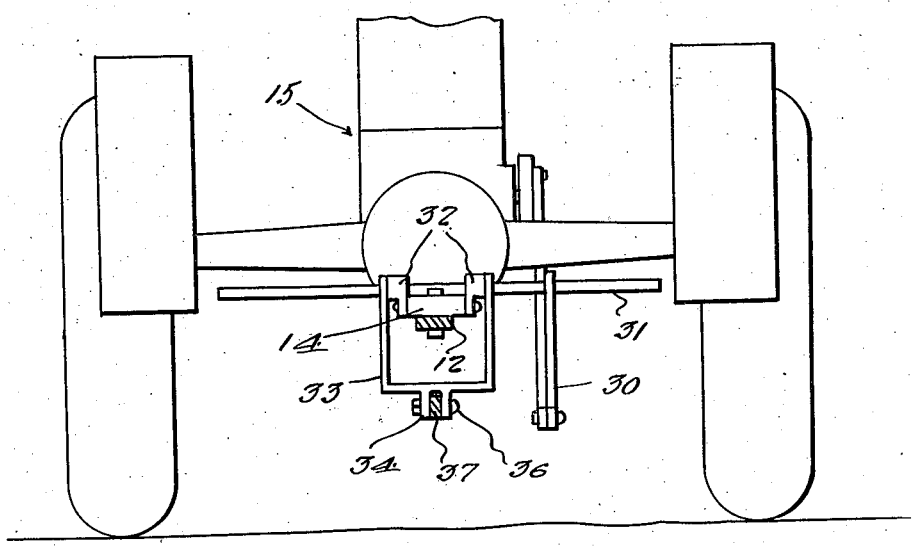
Figure 2 is a sectional view taken substantially on the line 2—2 of Figure 1.
Figure 3:
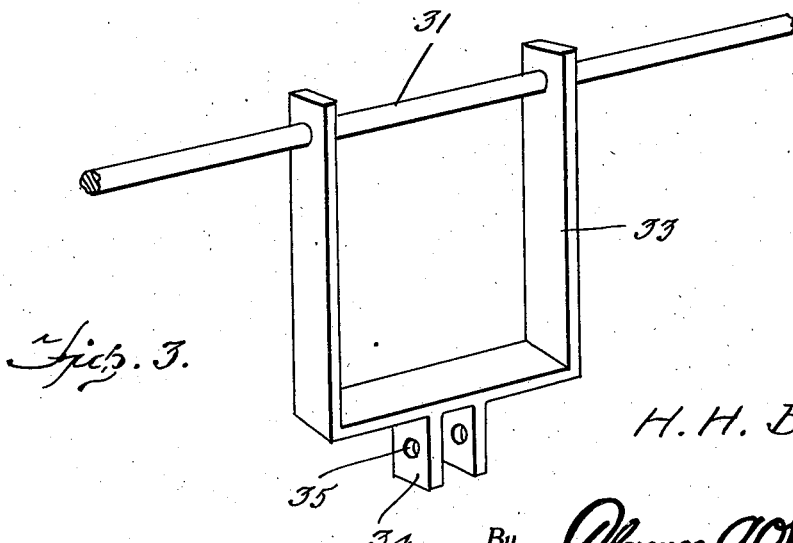
Figure 3 is a perspective view of the yoke shown in Figure 2.

Referring to the drawings wherein like numerals designate like parts, it can be seen that numeral 5 generally refers to the harrow which consists of the platform 6 from which rises the spring 7 supporting the seat 8. A barrel 9 at its forward end has the pin 10 disposed therethrough and through the yoke 11 at the rear end of the draft tongue 12 which is pivotally secured as at 13 to the tail piece 14 of the tractor generally referred to by numeral 15.

The frame 16 carries the gangs of disks 17 and is pivotally secured as at 18 to the platform 6. Numeral 19 represents the usual lever for operating the connecting rods 20 which are connected to the shafts 21 of the disk gangs pivotally as at 22. A quadrant rack 23 is secured to the platform 6 and against this is operative the detent 24. Thus by shifting the lever 19, the angle of the disk gangs can be changed, but in this connection the operator must be on the platform 6 whereas in carrying out the present invention, the operator may be seated on the tractor 15.

In carrying out the present invention, the usual power take off adapter 25 is employed. On this is mounted the disk 26 having the eccentric pin 27 disposed through the forward end of the connecting rod 28. The rear end of the rod 28 is pivotally secured as at 29 to the lower end of the arm 30 which depends from the shaft 31. This shaft 31 is journaled through bearings 32 on the tail piece 14. Numeral 33 represents a U-shaped yoke having the upper ends of its legs secured to the shaft 31. The lower bight portion of this yoke 33 is provided with a pair of depending ears 34—34 apertured as at 35 and through these ears is disposed the bolt 36 for pivotally securing the adjacent twisted end of the bar section 37 thereto. Connecting straps 38 connect the rear end of this section 37 to the adjacent end of the tension bar 39. The tension bar 39 is provided with the upstanding apertured lug 40 at its rear end and through this is disposed the rod 41 which also extends through an opening in the bight portion 42 of the U-shaped yoke 43 and also through the lug 44 which is secured suitably to the forward end of the tension bar 39.

A cross piece 45 on the yoke 43 supports a pair of rollers 46—46 on its lower side, these rollers being grooved to receive the longitudinal edge portions of the tension bar 39.

A nut is provided on the forward end of the rod 41 and cushioning springs 47 and 48 are provided on this rod at the opposite sides of the bight portion 42 of the yoke 43.

The rear ends of the legs of the yoke 43 are apertured to receive the aforementioned pin 22 at which point the lever 19 is connected with the disk gang operating frame 20.

Thus it can be seen that the driver of the tractor can readily control the disks 17 by clutching the valve take-off means usually found on tractors, this without requiring the stopping of the tractor and actuation of the hand bar 19 and this without requiring a second man on the harrow.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a tractor having a power take-off, an agricultural machine including ground-engaging elements, means for changing the angle of the elements, said means including a shaft on the tractor, a crank on the shaft, control means from the crank to the ground-engaging elements, an arm on the shaft, and a connection between the arm and the power take-off.

2. In combination with a tractor having a power take-off, an agricultural machine including ground-engaging elements, means for changing the angle of the elements, said means including a shaft on the tractor, a crank on the shaft, control means from the crank to the ground-engaging elements, an arm on the shaft, and a connection between the arm and the power take-off, a drive disk for the power take-off, said last-mentioned connection being eccentrically connected to the said disk.

3. In combination with a tractor having a power take-off, an agricultural machine including ground-engaging elements, means for changing the angle of the elements, said means including a shaft on the tractor, a crank on the shaft, control means from the crank to the ground-engaging elements, an arm on the shaft, and a connection between the arm and the power take-off, said line from the crank to the ground-engaging elements being divided into a pair of sections and shock-absorbing means between the said sections.

HARRY H. BUHR.